US006865526B1

(12) United States Patent
Henkel et al.

(10) Patent No.: US 6,865,526 B1
(45) Date of Patent: Mar. 8, 2005

(54) METHOD FOR CORE-BASED SYSTEM-LEVEL POWER MODELING USING OBJECT-ORIENTED TECHNIQUES

(75) Inventors: Jörg Henkel, Plainsboro, NJ (US); Tony Givargis, Anaheim, CA (US); Frank Vahid, Corona, CA (US)

(73) Assignees: University of California-Riverside, Oakland, CA (US); NEC Corporation, Tokyo (JP)

( * ) Notice: Subject to any disclaimer, the term of this patent is extended or adjusted under 35 U.S.C. 154(b) by 0 days.

(21) Appl. No.: 09/489,895

(22) Filed: Jan. 24, 2000

(51) Int. Cl.$^7$ .............................. G06F 17/50; G06F 7/54
(52) U.S. Cl. .............................. 703/18; 716/4; 716/14; 716/18
(58) Field of Search ................................ 716/4, 18, 14; 703/18

(56) References Cited

U.S. PATENT DOCUMENTS

| | | | |
|---|---|---|---|
| 5,481,469 A | | 1/1996 | Brasen et al. |
| 5,572,436 A | | 11/1996 | Dangelo et al. |
| 5,682,320 A | | 10/1997 | Khouja et al. |
| 5,696,694 A | | 12/1997 | Khouja et al. |
| 5,801,958 A | | 9/1998 | Dangelo et al. |
| 5,828,576 A | * | 10/1998 | Loucks et al. ................ 702/65 |
| 5,838,579 A | | 11/1998 | Olson et al. |
| 5,838,947 A | | 11/1998 | Sarin |
| 5,870,308 A | | 2/1999 | Dangelo et al. |
| 5,903,476 A | | 5/1999 | Mauskar et al. |
| 6,075,932 A | * | 6/2000 | Khouja et al. ................. 716/4 |
| 6,096,089 A | * | 8/2000 | Kageshima ................... 703/18 |
| 6,151,568 A | * | 11/2000 | Allen et al. |
| 6,223,274 B1 | * | 4/2001 | Catthoor et al. .............. 712/34 |
| 6,397,170 B1 | * | 5/2002 | Dean et al. .................... 703/14 |
| 6,622,287 B1 | * | 9/2003 | Henkel .......................... 716/2 |

OTHER PUBLICATIONS

Henkel Jorg, Givargis Tony D., Vahid Frank, "A hybrid approach for core–based system–level power modeling", IEEE, 2000, pp. 141–145.*
Chaitali Chakrabarti and Dinesh Gaitonde, "Instruction Level Power Model of Microcontrollers", IEEE 1999, pp. 76–79.*
Vivek Tiwari, Shadrad Malik, Andrew Wolfe, "Power Analysis of Embedded Software: A First Step Towards Software Power Minimization" IEEE 1994, pp. 437–445.*
A. Raghunathan, S. Dey and N.K. Jha, *Glitch Analysis And Reduction In Register–Transfer–Level Power Optimization*, IEEE Proc. of Design Automation Conference (DAC96), pp. 331–336 (1996).
A. Chandrakasan, M. Potkonjak, J. Rabaey and R. Brodersen, *Hyper–LP: A System for Power Minimization using Architectural Transformations*, IEEE Proc. of Int'l Conf. on Computer–Aided Design (IC–CAD92), pp. 300–303 (1992).
G. Lakshminarayana, A. Raghunathan, K.S. Khouri and N. K. Jha, *Common Case Computation: A High–Level Power–Optimizing Technique*, IEEE Proc. of Design Automation Conference (DAC99), pp. 1–6 (Jun. 1999).

(List continued on next page.)

*Primary Examiner*—Kevin J. Teska
*Assistant Examiner*—Dwin M. Craig
(74) *Attorney, Agent, or Firm*—Sughrue Mion, PLLC

(57) ABSTRACT

A method for reducing power consumption by using power estimation data obtained from at the gate-level for a core's representative input stimuli data (instructions), and propagating the power estimation data to a higher (object-oriented) system-level model, which is parameterizable and executable. Depending on the kind of cores, various parameterizable look-up table techniques are used to facilitate self-analyzing core models. As a result, the method is faster than gate-level power estimation techniques and power-related system-level design decisions.

8 Claims, 13 Drawing Sheets

OTHER PUBLICATIONS

S. Kumar, J. Aylor, B. Johnson and W. Wuif, *Object–Oriented Techniques in Hardware Design*, IEEE Computer, vol. 27, pp. 64–70 (Jun. 1994).

F. Mallet, F. Hoed, and J.F. Duboc, *Hardware Architecture Modeling Using an Object–Oriented Method*, Proceedings of the 24th EUROMICRO Conference, pp. 147–153 (Aug. 1998).

C. Passerone, R. Passerone, C. Sansoe, J. Martin, A. Sangiovanni–Vincentelli and R. McGeer, *Modeling Reactive Systems in Java*, Proceedings of the Sixth International Workshop on Hardware/Software Codesign, pp. 15–19 (Mar. 1998).

J. S. Young, J. MacDonald, M. Shilman, A. Tabbara, P. Hilfinger and A. R. Newton, *Design and Specification of Embedded Systems in Java Using Successive Formal Refinement*, Proceedings of the Design and Automation Conference, pp. 70–75 (Jun. 1998).

F. Vahid and T. Givargis, *Incorporating Cores into System–Level Specification*, International Symposium on System Synthesis, pp. 43–48 (Dec. 1998).

T. Givargis and F. Vahid, *Interface Exploration for Reduced Power in Core–Based Systems*, International Symposium on System Synthesis, pp. 117–122 (Dec. 1998).

T. Givargis, J. Henkel and F. Vahid, *Interface and Cache Power Exploration for Core–Based Embedded System Design*, Submitted to International Conference on Computer Aided Design (Nov. 1999).

W. Fornaciari, D. Sciuto and C. Silvano, *Power Estimation for Architectural Explorations of HW/SW Communication on System–Level Buses*, To be published at HW/SW Codesign Workshop, Rome, pp. 152–156 (May 1999).

Jue–Hsien Chem, Jean Huang, Lawrence Arledge, Ping–Chung Li and Ping Yang, *Multilevel Metal Capacitance Models for CAD Design Synthesis Systems*, IEEE Electron Device Letters, vol. 13, No. 1, pp. 32–34 (Jan. 1992).

B. Payne, *Rapid Silicon Prototyping: Paradigm for Custom–on–a–Chip Design*, http://www.vlsi.com/velocity (1998).

A. Evans, A. Silburt, G. Vrckovnik, T. Brown, M. Dufresne, G. Hall, T. Ho and Y. Liu, *Functional Verification of Large ASICs*, Design Automation Conference, pp. 650–665 (1998).

R. Gupta and Y. Zorian, *Introducing Core–Based System Design*, IEEE Design and Test, vol. 14, No. 4, pp. 15–25 (Oct.–Dec. 1997).

* cited by examiner

| Buffer Size (bytes) | Area (transistors) | Toggle-Count |
|---|---|---|
| 2 | 4552 | 203 |
| 4 | 7360 | 232 |
| 8 | 1576 | 238 |
| 16 | 22600 | 249 |

```
class UART {
    unsigned toggle_count = 0;
    public Reset() {
        data_txbuf = 0, data_rxbuf = 0;
        toggle_count += TOGGLE_TABLE[RESET];
    }
    public EnableTx() {
        for( int i = 0; i < 8; i++ )
            s_out = (data_txbuf >> i) & 0x01;
        toggle_count += TOGGLE_TABLE[ENABLETX];
    }
    public WriteTxBuf(unsigned char x) {
        data_txbuf = x;
        toggle_count += TOGGLE_TABLE[WRITEBUF];
    }
    public ReadRxBuf(unsigned & x) {
    // implementation of reading character from buffer
        toggle_count += TOGGLE_TABLE[READBUF];
    }
};
```

*FIG. 5*

METHOD FOR CORE-BASED SYSTEM-LEVEL POWER MODELING USING OBJECT-ORIENTED TECHNIQUES

TECHNICAL FIELD OF THE INVENTION

Apparatuses and methods consistent with the invention are related to the acquisition of fast and accurate estimations of the power requirement for a VLSI circuit, specifically to the creation and use of core models of circuit elements incorporating instruction-level simulation coupled with gate-level energy analysis. In particular, the core models for the circuit elements are developed using object-oriented paradigms, and then instantiated into an overall device model, thereby allowing simulations of various device functions to be executed and the energy and power requirements of the device to be assessed.

BACKGROUND

The following references provide useful background information on the indicated topics, all of which relate to the invention, and are incorporated herein by reference.

Low power techniques based upon glitch reduction for register-transfer level circuits:
A. Raghunathan, S. Dey and N. K. Jha, *Glitch Analysis And Reduction In Register-Transfer-Level Power Optimization*, IEEE Proc. of Design Automation Conference (DAC96), pp. 331–336 (1996).

Synthesis environment using high-level power estimation:
A. Chandrakasan, M. Potkonjak, 3. Rabaey and R. Brodersen, *Hyper-LP: A System for Power Minimization using Architectural Transformations*, IEEE Proc. of Int'l Conf. on Computer-Aided Design (IC-CAD92), pp. 300–303 (1992).

Optimization of power consumption with high level design methodologies:
G. Lakshminarayana, A. Raghunathan, K. S. Khourl and N. K. Jha, *Common Case Computation: A High-Level Power-Optimizing Technique*, IEEE Proc. of Design Automation Conference (DAC99), pp. 1–6 (June 1999).

Use of object-oriented techniques to improve the hardware design process:
S. Kumar, 1. Aylor, B. Johnson and W. Wuif, *Object-Oriented Techniques in Hardware Design*, IEEE Computer, Vol. 27, pp. 64–70 (June 1994).

Simulation environment to evaluate the number of cycles for application processing:
F. Mallet, F. Hoed, and J. F. Duboc, *Hardware Architecture Modeling Using an Object-Oriented Method*, Proceedings of the 24th EUROMICRO Conference, pp. 147–153 (August 1998).

Using JAVA for concurrent modules and asynchronous communication therebetween:
C. Passerone, R. Passerone, C. Sansoe, J. Martin, A. Sangiovanni-Vincentelli and R. McGeer, *Modeling Reactive Systems in Java*, Proceedings of the Sixth International Workshop on Hardware/Software Codesign, pp. 15–19 (March 1998).

Techniques for system specification refinement:
J. S. Young, J. MacDonald, M. Shilman, A. Tabbara, P. Hillfinger and A. R. Newton, *Design and Specification of Embedded Systems in Java using Successive Format Refinement*, Proceedings of the Design and Automation Conference, pp. 70–75 (June 1998).

Design and incorporation of core models into system-level specifications:
F. Vahid and T. Givargis, *Incorporating Cores into System-Level Specification*, International Symposium on System Synthesis, pp. 43–48 (December 1998).

Bus configurations for a given set of communications channels:
T. Givargis and F. Vahid, *Interface Exploration for Reduced Power in Core-Based Systems*, International Symposium on System Synthesis, pp. 117–122 (December 1998).

Core-based modeling for systems-on-a-chip:
T. Givargis, 1. Henkel and F. Vahid, *Interface and Cache Power Exploration for Core-Based Embedded System Design*, Submitted to International Conference on Computer Aided Design (November 1999).

Modeling switching activity for on-chip and off-chip busses;
W. Fornaciari, D. Sciuto and C. Silvano, *Power Estimation for Architectural Explorations of HW/SW Communication on System-Level Buses*, To be published at HW/SW Codesign Workshop, Rome, pp. 152–156 (May 1999).

Empirical model for multi-level interconnect capacitance:
Jue-Hsien Chem, Jean Huang, Lawrence Arledge, Ping-Chung Li and Ping Yang, *Multilevel Metal Capacitance Models for CAD Design Synthesis Systems*, IEEE electron Device Letters, Vol. 13, No. 1, pp. 32–34 (January 1992).

Background and future trends in rapid silicon prototyping:
B. Payne, *Rapid Silicon Prototyping: Paradigm for Custom System-on-a-Chip Design*, http://www.vlsi.com/velocity (1998).

Functional verification of large ASICs:
A. Evans, A. Silburt G. Vrckovnik, T. Brown, M. Dufresne, G. Hall, T. Ho and Y. Liu, *Functional Verification of Large ASICs*, Design Automation Conference, pp. 650–665 (1998).

Fundamentals of core-based design:
R. Gupta and Y. Zorian, *Introducing Core-Based System Design*, IEEE Design and Test, Vol. 14, No. 4, pp. 15–25 (Oct.-Dec. 1997).

There will now be provided a discussion of various topics to provide a proper foundation for understanding the invention.

As chip capacities continue to grow, enabling systems-on-a-chip (hereinafter "SOC"), the need for early simulation of system-level models increases. A system-level model describes desired behavior without describing detailed structural or timing information, and such models are often specified in executable languages like C++ or JAVA, eliminating the need for a separate simulation tool. Such models thus simulate many orders of magnitude faster than lower-level models like register-transfer or gate-level hardware description language (hereinafter "HDL") models, turning otherwise week-long or month-long simulations into just minutes or hours. These models are useful for early observation of system behavior and perhaps high-level performance information and thus designers taking a top-down approach often build and simulate such models before developing lower-level models. However, system-level models have the disadvantage of not providing sufficiently accurate information on detailed design metrics like power consumption and size, so architectural design decisions must often be postponed until later in the design process when lower-levels models are available.

A core is a reusable system-level component, such as a microprocessor, coprocessor or peripheral component, designed to become part of a SOC. Usually a core is a pre-designed, pre-verified silicon circuit block containing upwards of five thousand gates that can be used in building a larger or more complex application on a semiconductor chip. A soft core consists of a synthesizeable HDL description that can be re-targeted to different semiconductor processes. A firm core contains more structure, usually a gate-level netlist that is ready for placement and routing. A hard core includes layout and technology-dependent timing information as is ready to be dropped into a system. By many estimates, SOCs will consist mostly of cores, perhaps upwards of ninety percent, with custom synthesized logic comprising the small remaining portion. Because cores are often parameterized and their interconnecting bus structure may be flexible, core-based designs still involve a large design space and hence many architectural design decisions.

The Virtual Socket Interface Alliance (hereinafter "VSIA") is an industry consortium developing core-related standards. Those standards include the development of system-level models for all cores (whether soft, firm or hard). The situation of system-level models representing already-designed components provides a unique opportunity. In particular, it would be particularly useful for the developer of a core's system-level model to have information on the core's power, performance and size metrics (unlike the case when the model was created by a designer following the top-down approach), since a low-level model does exist for cores. Since the core developer wants the core to be re-used, we can: expect the developer to expend effort incorporating such metric information into the core's system-level model. This opportunity can be used to overcome the earlier-stated disadvantage of inaccurate estimates from system-level models, and thus can enable extensive design space exploration at the system level.

As for the register transfer language level (hereinafter "RTL") approaches described in the literature, a power optimization method has been introduced that minimizes power at the architectural level (RTL-level) by using a macro model scheme. The Hyper-LP described in the literature belongs to the same group. Hyper-LP is a framework that optimizes power consumption of data-dominated systems through architectural transformations. Recently, Lakshminarayana, et al. put forth a behavioral-level power optimization method called common-case computation. So called common cases are exploited in order to synthesize a compact datapath such that power reductions of up to around ninety-two percent become possible.

As for high-level modeling, Kumar, et al. proposes modeling of hardware components, e.g., comparators and registers, as objects communicating via method calls. These objects serve as the building blocks of complex systems. Mallet, et al. proposes similar modeling of components communicating with each other via ports and signals allowing for good estimation of performance. However, modeling complex digital systems requires modeling of components at higher levels of abstraction, e.g., processors and JPEG encoders.

Other researchers have contributed object-oriented models, mainly based on JAVA, that enable hardware description at a behavioral abstraction level. In addition to providing models for capture and simulation of digital systems, these contributions provide solutions to problems—such as: ease of conversion from high-level description to hardware description for synthesis, modeling of reactive systems, and deterministic modeling of digital systems with bounded resource allocation. To the best of our knowledge, these contributions do not provide means for power and area and performance estimation at the system level.

Vahid and Givargis propose specification of more abstract components, i.e., SOC cores, that communicate via method-calling or message-passing. Their high-level model and functional communication allows for exploration of SOC busses for low power. Other work by Givargis, et al. extends this exploration with power and performance results obtained from CPU, interface and cache simulations.

SUMMARY OF INVENTION

The invention has been made in view of the above circumstances and the exemplary and non-limiting embodiments of the present invention may overcome the above disadvantages and other disadvantages not described above. However, the present invention is not required to overcome the disadvantages described above, and the exemplary and non-limiting embodiments of the present invention may not overcome any of the problems described above.

An aspect of the invention is a method and a computer program product for energy and power estimation for a SOC, wherein the energy and power estimates are calculated using core models.

Another aspect of the invention is a method and a computer program product for implementing a core model that correlates simulated functionality to gate-level simulations of energy and power consumption.

Another aspect of the invention is computer executable code for simulating the energy and power requirements of a SOC;

Another aspect of the invention is a class library, wherein the class library contains parameterized core models that can be instantiated into a simulation of a system design;

According to an aspect of the invention, the circuit model incorporated into the core model may be based upon a hardware description language.

According to an aspect of the invention, a plurality of instructions can be that are correlated to the functions of the circuit model in the core module.

According to an aspect of the invention, an object oriented client application may construct an instance of a class for the purpose of representing the functions of a silicon circuit block that is included in a large scale integrated circuit.

The attributes and behavior of a silicon circuit block is preserved, where appropriate. In a corresponding class in the client, and are available to the client application for energy and power estimation.

Preferably, but not necessarily, an aspect of the invention provides a method for energy and power estimation of a core-model based embedded system by capturing gate-level energy simulation data, deploying the captured gate-level simulation data in an algorithmic-level executable specification, wherein the captured gate-level data simulation data correlates to a plurality of instructions, and executing the algorithmic-level executable specification to obtain energy estimations for each instruction.

Preferably, but not necessarily, an aspect of the invention provides a method of modeling energy and power requirements for a system-on-a-chip by deploying a circuit model of the system-on-a-chip by selecting at least one parameterized instruction-based core model and instantiating the at least one parameterized instruction-based core model, executing the circuit mode, analyzing the estimated energy requirements of the circuit model, and outputting the estimated energy requirements for the circuit model.

Preferably, but not necessarily, an aspect of the invention provides a method for creating a library of instruction-based core energy models by deploying a circuit model using a hardware description language, defining a plurality of high-level instructions correlating to functions supported by the circuit model, acquiring gate-level energy simulation data for each component comprising the circuit model, collecting a plurality of toggle count sets corresponding to each of the plurality of high-level instructions, assigning each of the plurality of toggle count sets to one of the plurality of high-level instructions, thereby creating an instruction-based core energy model, and implementing the instruction-based core energy model within the library that is realized as a look-up table.

Preferably, but not necessarily, an aspect of the invention also provides a computer program product for use in a computer system in which core models are accessed by an application program, the computer program product including a computer usable medium bearing computer executable code, including a first executable code portion for determining if the core model should simulate an idle state or execute an instruction, based upon whether the core model is called by another core model or it is called by a control object, a second executable code portion for determining if resources required by the core model are free, and claiming the free resources, a third executable code portion for adding an idle energy value to an energy accumulator, a fourth executable code portion for determining if a clock counter are decremented, thereby collecting data about the elapsed time and calculating the consumed power from the energy data, a fifth executable code portion for simulating execution of a predetermined instruction, and a sixth executable code portion for adding energy value to the energy accumulator.

Preferably, but not necessarily, an aspect of the invention provides a computer program product for use in a computer system in which core models are accessed by an application program, including a computer usable medium bearing computer programming statements for enabling the computer system to create at least one circuit model object for use by the application program, the computer programming statements including a class library expressing an inheritance hierarchy and including at least one core model base class for constructing instances of a circuit model object, with the core model base class representative of a circuit element, the core model base class including, as a respective subclass thereof, an autonomous core model class defining at least one core model member function for directly interacting with the application program, and the core model member function simulating an instruction associated to the circuit element, the circuit element providing one-time predetermined data correlated to the simulated instruction.

Preferably, but not necessarily, the invention provides a computer system having an application program that models the energy and power requirements of a system-on-a-chip circuit design, with an energy and power modeling method for an application program to access and execute a parameterized core model of a circuit element, the method providing to the application program a circuit object representing a modeled circuit, with the circuit object having instantiated a parameterized core model having member functions for simulating functions assigned to circuit element, wherein the member functions output an energy and power estimation correlated with each simulated function, the application program sending a message to the circuit object to invoke the member functions, thereby executing a simulated function of the circuit element; and the circuit objects sending a message from the circuit object to the application program embodying the energy and power estimation with respect to the invoked member function.

An embodiment of the invention may be implemented using the C++ programming language, but any other object oriented language or environments capable of supporting its concepts, such as SMALLTALK, the MICROSOFT OLE/COM architecture, may be used as well. C++ has been chosen because it is widespread and therefore it easy convenient to make the concepts of this invention clear.

BRIEF DESCRIPTION OF DRAWINGS

The accompanying drawings, which are incorporated in and constitute a part of this specification illustrate embodiments of the invention and, together with the description, serve to explain the aspects of the invention. In the drawings.

FIG. 5 is a code fragment depicting the functions of a UART;

DETAILED DESCRIPTION OF EXEMPLARY EMBODIMENTS OF THE INVENTION

Figure 1A:
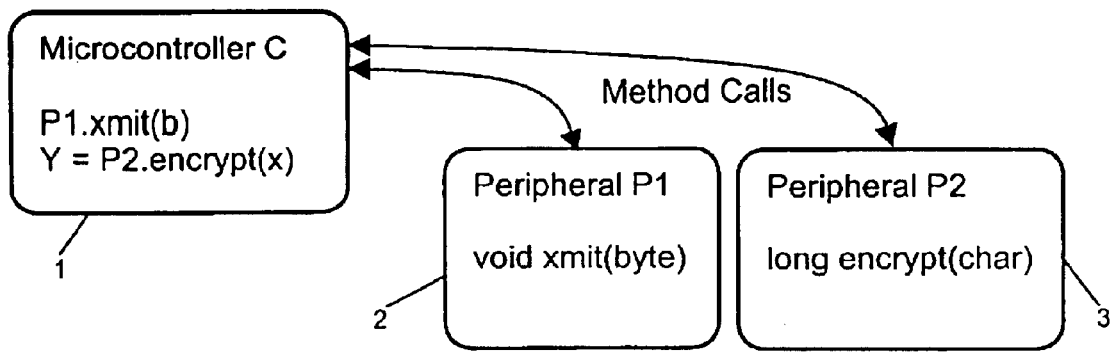
FIG. 1A is a block diagram illustrating modeling using method-calling.

Prior to describing the exemplary embodiments, some details will be provided to facilitate the reader's understanding set forth the meaning of various terms.

As used herein, the term "computer systems" encompasses the widest possible meaning and includes, but is not limited to, standalone processors, networked processors, mainframe processors, processors in a client/server relationship, and embedded processors. The term "computer system" is to be understood to include at least a memory and a processor.

In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That to say, it is foreseen that the processor and the memory might be in different physical pieces of equipment or even in geographically distinct locations.

Computer applications programmers develop computer-based applications to fulfill end user needs. The advance of technology has made it possible to develop applications of great complexity. One of the key aspects of fulfilling end user needs is the correct representation of complex real-world systems.

The need to represent and synthesize complex real-world systems in computer usable form has led to the development of core models for representing circuit elements. A useful approach is to provide a set of computer programs and techniques that facilitate the creation, management, and manipulation of core models during VLSI design. Using a library of core models, a VLSI designer can develop an applications program to model an electronic device, without intimate knowledge of the underlying circuitry in the core model.

As mentioned above, applications programs can be used to access core models to accurately simulate the VLSI design, in addition to synthesizing the VLSI design. Used in this sense, the term "applications programs" may refer to several separate programs, only one program, a module of a program, or even a particular task of a module.

An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely known programming paradigms include, but are not limited to, the top-down, the data-driven, and the object oriented (hereinafter "OO") programming paradigms.

The OO paradigm is based on the object model. One of skill in the art readily understands the object model. For detailed information concerning the object model, a useful book is "Object-Oriented Analysis and Design" by Grady Booch (Addison-Wesley Publishing Company).

Recently, object oriented analysis and design (hereinafter "OOAD") and object oriented programming (hereinafter "OOP") have been the focus of great attention. OOAD and OOP are thought to provide advantages with respect to, but not limited to, abstraction, encapsulation, modularity, and hierarchy. Furthermore, OOAD is thought to provide for improved software reuse and better adaptability to change.

According to the object model, a software system is modeled as collections of cooperating objects. Individual objects are treated as instances of a particular class. Each class has a place within a hierarchy of classes.

An object is understood to have a unique identity, to have a state, and to exhibit behavior. The behavior of an object relates to the set of operations that may be performed by the object. Such operations are also known, interchangeably, as methods of the object or as member functions of the object. Member functions of an object are invoked by passing the object an appropriate message.

An object may retain data of interest. Passing the object appropriate messages may invoke a member function of the object to manipulate the data. For example, an object may store data in a buffer, and might have a member function for transmitting the data from that buffer. Under the object model, when an appropriate message, such as "transmit message in buffer," is passed to the object, the transmit member function is invoked and the stored data is transmitted from the buffer.

The invoking of member functions of objects to perform tasks is a central concept of the OO paradigm.

Objects can be related to each other. Two objects might have a client/supplier relationship or otherwise linked. Two objects might have a hierarchical relationship. For example, one object might represent a switch and another a controller. The controller object may thus be said to be higher in a hierarchy than the switch. Assuming the controller has more than one switch, there might be several switch objects that are so related with the controller object. Hierarchically related objects are said to be aggregated. In particular, the controller object and its switch objects may be referred to as an aggregate, or an aggregation. The switch objects may be referred to as being attributes, or members of the aggregation. The controller object, by virtue of its position at the "top" of the hierarchy in the aggregation, may be referred to as an aggregating object.

An object cannot be considered without regard to its class. Every object, when constructed, receives its structure and behavior from its class. An object may be referred to as a class instance, or as an instance of a class. Classes, in the object model, may be hierarchically related. In particular, the relationship between two classes may be a subclass/superclass relationship. A subclass may inherit the structural and behavioral features of its superclass.

Thus, whenever an object is constructed, it receives important attributes from its class, such as a predefined set of member functions. If that class is a subclass of a particular superclass, the object may receive certain attributes from the superclass as well.

Classes, on a practical level, are supplied in class libraries on any one of a variety of media. Furthermore, the class definitions contained in class libraries are actually statements written in a programming language. Such programming language statements, when executed by a computer, cause the computer to act in accordance with the particular content of the statements. Furthermore, a class library may be provided in any number of forms including, but not limited to, original source code, assembly code, object code, machine language, compressed or encrypted versions of the foregoing and any and all equivalents.

One of skill in the art will appreciate that "media", or "computer-readable media", as used here, may include a diskette, a tape, a compact disc, an integrated circuit, a cartridge, a remote transmission via a communications circuit, or any other similar medium useable by computers. For example, to distribute a class library, the supplier might provide a diskette or might transmit the class library in some form via satellite transmission, via a direct telephone link, or via the Internet.

Although a class library might be "written on" a diskette, "stored in an integrated circuit, or "carried over" a communications circuit, it will be appreciated that, for the purposes of this discussion, the computer usable medium will be referred to as "bearing" the class library. Thus, the term "bearing" is intended to encompass the above and all equivalent ways in which a class library is associated with a computer usable medium.

For the sake of simplicity, therefore, the term "program product" is hereafter used to refer to a computer useable medium, as defined above, which bears a class library in any form.

The present invention capitalizes on cores to obtain sufficiently is accurate estimates using system-level models. The present invention combines the accuracy of lower-level power estimation approaches with the convenient facility of a fast and parameterizable system-level approach. The present invention deploys power data collected from gate-level simulations to estimate the power and performance of a core using object-oriented models. It is important to notice that the gate-level simulations have to be done only once for a characteristic set of instructions of a core and that this data can be re-used at the OO-level using a facility of a parameterizable look-up mechanism. The present invention uses a relaxed definition of the term instruction: unlike the case of a processor core wherein an instruction might denote operations like add or shift, an instruction in the present invention might be in the context of a UART might denote a "writing to" or "reading from". In case of a more complex core like a JPEG compression engine, for example, an instruction might be as complex as "compress a whole frame with a given compression ratio". Please note that these are only examples to make the principles of a varying complexity of our definition of instructions clear. As a result, the present invention is orders of magnitudes faster than approaches proposed so far, but at a accuracy that is relatively close to low-level obtained power estimations.

Two system-level modeling approaches, namely, method-calling objects and message-passing processes will be briefly described. The major distinction between these two approaches is the way in which core models communicate and synchronize with each other, as described following.

Referring to FIG. 1A, in method-calling objects, each core model is represented as an object, which communicate with each other via method calls. The microcontroller 1 and the peripherals 2,3 are core models that are represented as objects. Parameter passing is used to exchange data between core models. The objects may be active objects, meaning each has its own thread of control. Calling a method may be used to transfer control from one core model to another, and provides a means for synchronization. The high-level implementation of the core model is entirely divided up among the methods of the high-level object. Method-calling objects provides for a very high-level encapsulation of core models with a functional interface allowing for early exploration of system-on-chip busses and encoding schemes. Method-calling objects can be converted to message-passing processes by converting all objects to active ones, and replacing method calls by message passes.

Figure 1B:
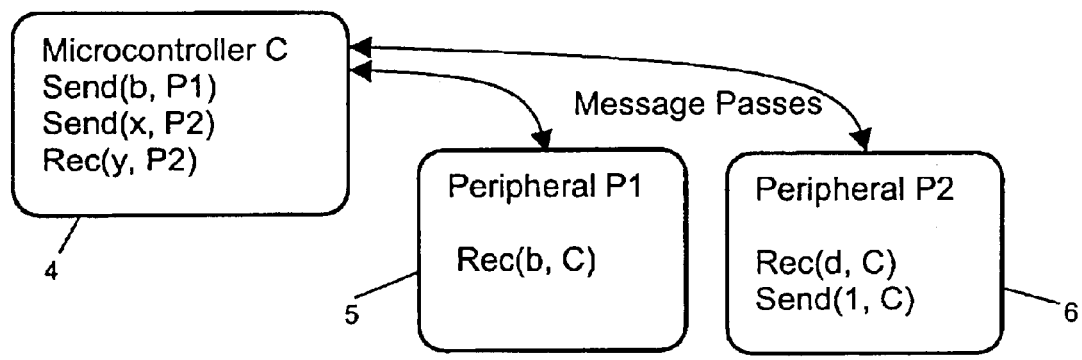
FIG. 1B is a block diagram illustrating modeling using message-passing.

Referring to FIG. 1B, in message-passing processes, each core model is represented as a process (perhaps using active objects). Microcontroller 4 and peripherals 5,6 are core models that are represented by processes. Communication is accomplished by passing messages from one object to another. Sending of a message blocks the sender until the reception of the message by the receiving object, hence providing synchronization via message passing. This model is based on Hoare's model of communicating sequential processes. Here, the high-level implementation of the core resides in an infinitely running loop, e.g., the "run" method. A core model based on message passing objects can be automatically refined into a lower level implementation. For example, each object's "run" method is converted into a process in a low-level HDL. Likewise, the "sends" and "receives" are converted to bus structures, i.e., ports and signals.

The former approach is more abstract and hence may be easier to work with and may also execute faster. The latter approach involves more communication detail and so may be slower but is closer to a hardware implementation. Both approaches, however, are still extremely fast. The teachings of the present invention can be incorporated into either of these modeling approaches.

Figure 1C:
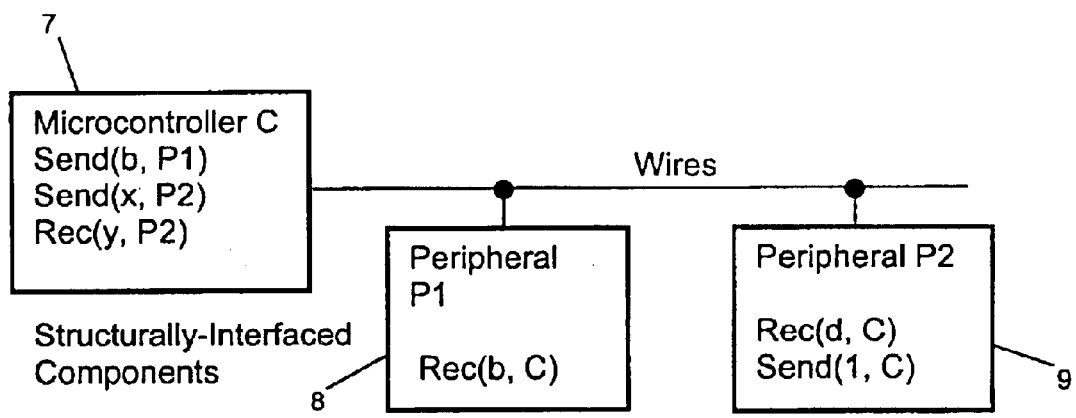
FIG. 1C is a block diagram illustrating modeling using structurally interfaced components.

Referring to FIG. 1C, this specification level corresponds to a netlist of system level components, which is equivalent to a traditional system-level block diagram. Microcontroller 7 and peripherals 8,9 are represented as system-level components. The external interface of each system-level component is fixed and wires connect each component together. Internally, each component can still be described behaviorally.

Figure 2:
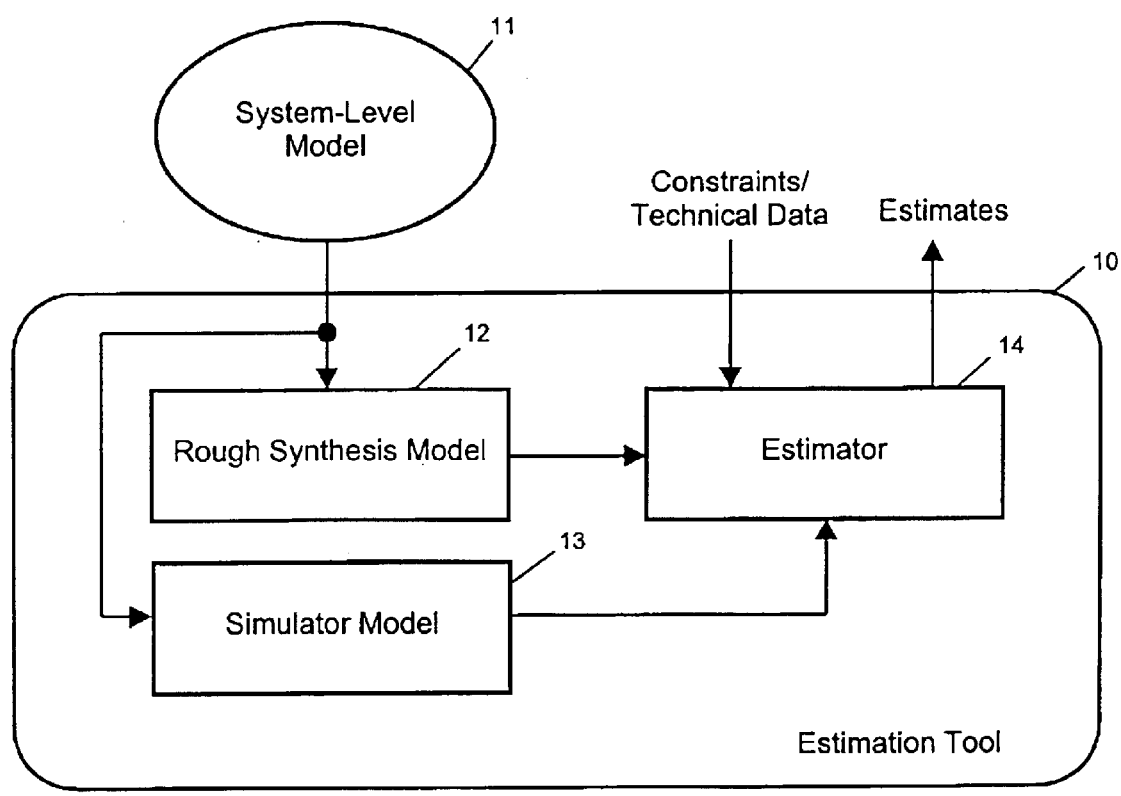
FIG. 2 is a block diagram illustrating a prior art method of determining energy and power estimation for a simulated circuit.

Previous system-level estimation approaches have been developed to work with designs that are fully described and then synthesized. Referring to FIG. 2, estimation tool 10 requires a system-level model 11 of a design as input. This system-level model 11 is subsequently synthesized to gather low-level information about the design to create a rough synthesis model 12. In addition, the designer is required to provide constraints and technology specific information, e.g., clock frequency, to the estimation tool 10. A simulation model 13 is obtained by a performing a simulation of the system-level model 11 as is known in the art. Constraints and technology information, combined with simulation model 13 and the information provided by the rough synthesis model 12, are then used by an estimator 14 to provide power, area, and performance estimates.

Figures 3, 4:
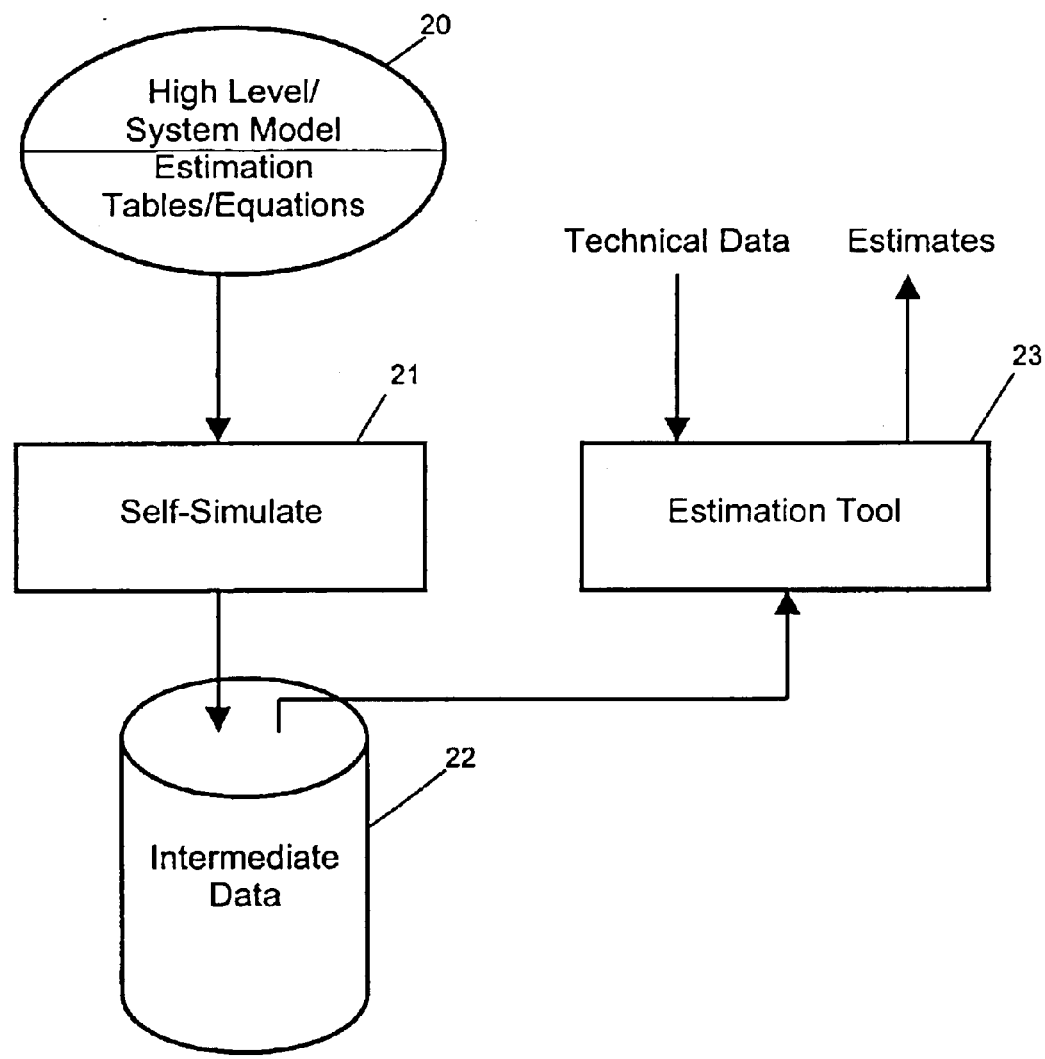
FIG. 3 is a table depicting typical toggle counts for buffers of various sizes.
FIG. 4 is a block diagram illustrating an embodiment of the present invention.

Core-based design provides a unique opportunity to develop estimation tools that can estimate power, area and performance with good accuracy at a much higher speed than conventional approaches i.e. RTL-based or gate-level-based approaches. This is because for pre-designed core models, a low-level model is always available, e.g., RT-synthesizeable HDL for soft cores, netlist for firm cores and layout for hard cores. An estimation tool can use this low-level knowledge to better estimate system metrics. By way of example, consider a parameterizable UART core implemented by a core-supplier in synthesizable HDL. By performing gate-level simulation of the UART, area and toggle switch information for different parameter settings can be obtained as illustrated in FIG. 3. A buffer size can be selected and the number of transistors and corresponding toggle counts will be used in the simulation. With this data available for all cores, the area (hardware effort) of a core-based system can be estimated by summing the area of the individual cores. Likewise, after simulation of a core-based design at system-level, one can use low-level obtained toggle data to accumulate total toggle counts and estimate power consumption of the design.

Referring to FIG. 4, an approach for a system-level model of a core-based design is depicted. In this approach, high-level model 10 is created. The high-level model 10 will contain lookup-tables or equations obtained from low-level simulations. Thus, after performing a self-simulation 21, intermediate data 22 is collected, e.g., toggle-count, to be combined with technology data in subsequent estimation performed by an estimation tool 23. As used herein, toggle-count is the number of transistor state-transitions when executing a function. Transistor state transitions are responsible for the power consumption within VLSI circuits.

In method-calling objects, each method is augmented with a section of code that accumulates data during simulation. Referring to FIG. 5, an object class for instantiating a UART core model is illustrated. The UART class has four member functions: Reset (reset the UART), EnableTx (enable transmitting from the UART), WriteTxBuf (write data from the UART) and ReadRxBuf (read data received by the UART). These four functions are representative of the electrical functions performed in a system by an actual UART. In this core model class, it is assumed that TOGGLE_TABLE is obtained from gate-level simulation. Hence, each time a member function of the instantiated UART core model is executed, the appropriate toggle count is added to the total toggle count for the UART core model. At the end of the simulation, the accumulated toggle count is used to estimate the power usage of the UART core model.

Figure 6:
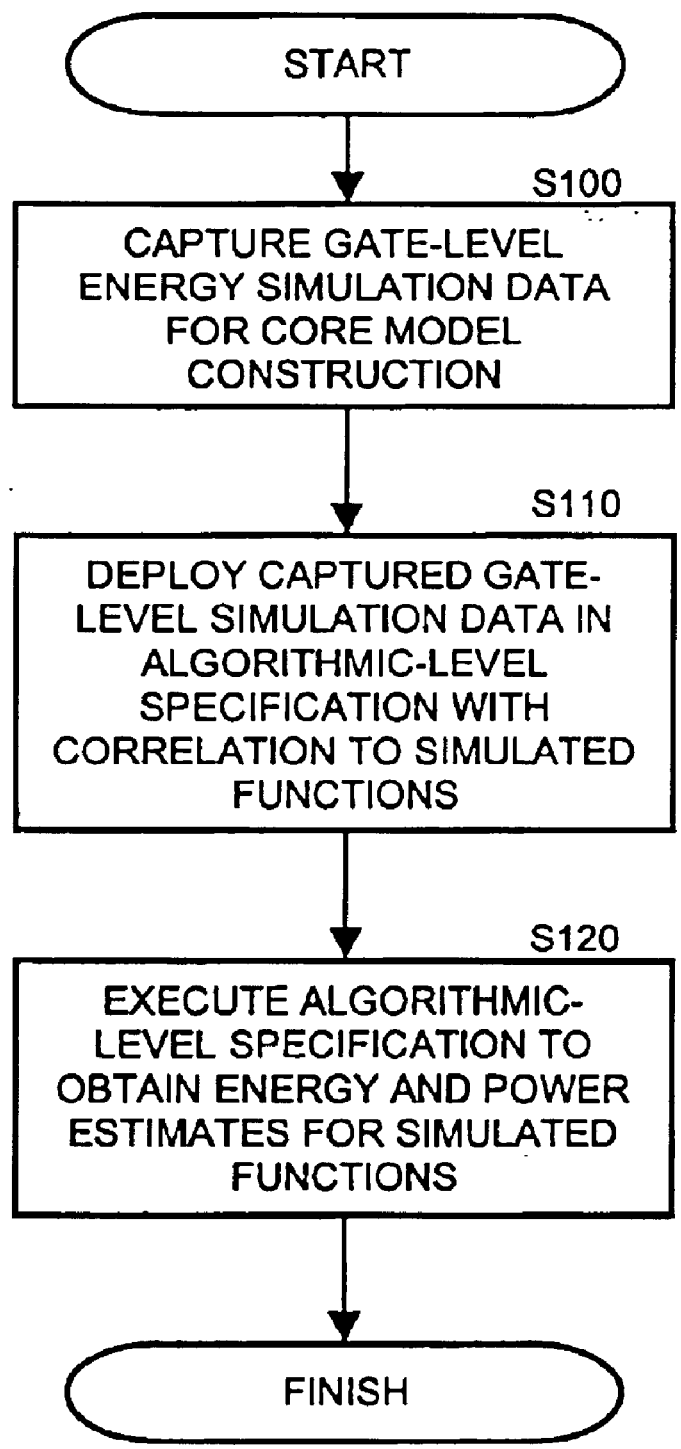
FIG. 6 illustrates a first embodiment for developing and using a core model according to the present invention.

A first embodiment of the present invention is a method for energy and power estimation of a core model based embedded system with reference to FIG. 6. The method will be described in summary fashion. At Step S100, gate-level energy simulation data is captured for the construction of the core model. At Step S110, the captured gate-level simulation data is deployed in an algorithmic-level executable specification. The captured gate-level data simulation data is correlated to instructions that are associated with the core model. At Step S120, the algorithmic-level executable specification is executed to obtain energy estimations for each instruction that is simulated by the core model.

The capturing of gate-level simulation data in Step S100 will now be described in greater detail. First, a core developer will start by designing and capturing the functionality of the core model using a hardware description language. Then, the core developer will identify a set of instructions describing the functionality of this core model. Referring to FIG. 5, in the case of the UART core, the following instructions can be identified: Reset (reset the UART), EnableTx (enable transmitting from the UART), WriteTxBuf (write data from the UART) and ReadRxBuf (read data received by the UART).

The initial set of instructions is defined by means of the following characteristics: a) data dependency of an instruction's energy consumption; and b) correlation between instructions (i.e., does the energy consumption of an instruction depend on the successor instruction, for example). The idea is to start with a large (i.e., implying a high simulation complexity) initial set of instructions since this will ensure a high accuracy for energy estimation though the overall estimation effort (through simulation) might be too complex.

The next step is to acquire gate-level simulation data to be used in high-level estimation. Given a HDL description of a core and a set of instructions, the core developer will create specialized testbench programs for each instruction in order to measure design metrics such as performance or power. By way of example, assuming that the designer is developing a UART core, a testbench is created that performs a write to the transmit hold registers, i.e., executes the "write-reg" instruction. Then, the HDL description of the UART is synthesized and the UART is simulated using the testbench, accumulating toggle switch information. The process is repeated for all other identified instructions and create a table of toggle switches per instructions. If a core is parameterizable, multiple tables for different parameter values must be obtained, or estimated via equations.

Figure 7:
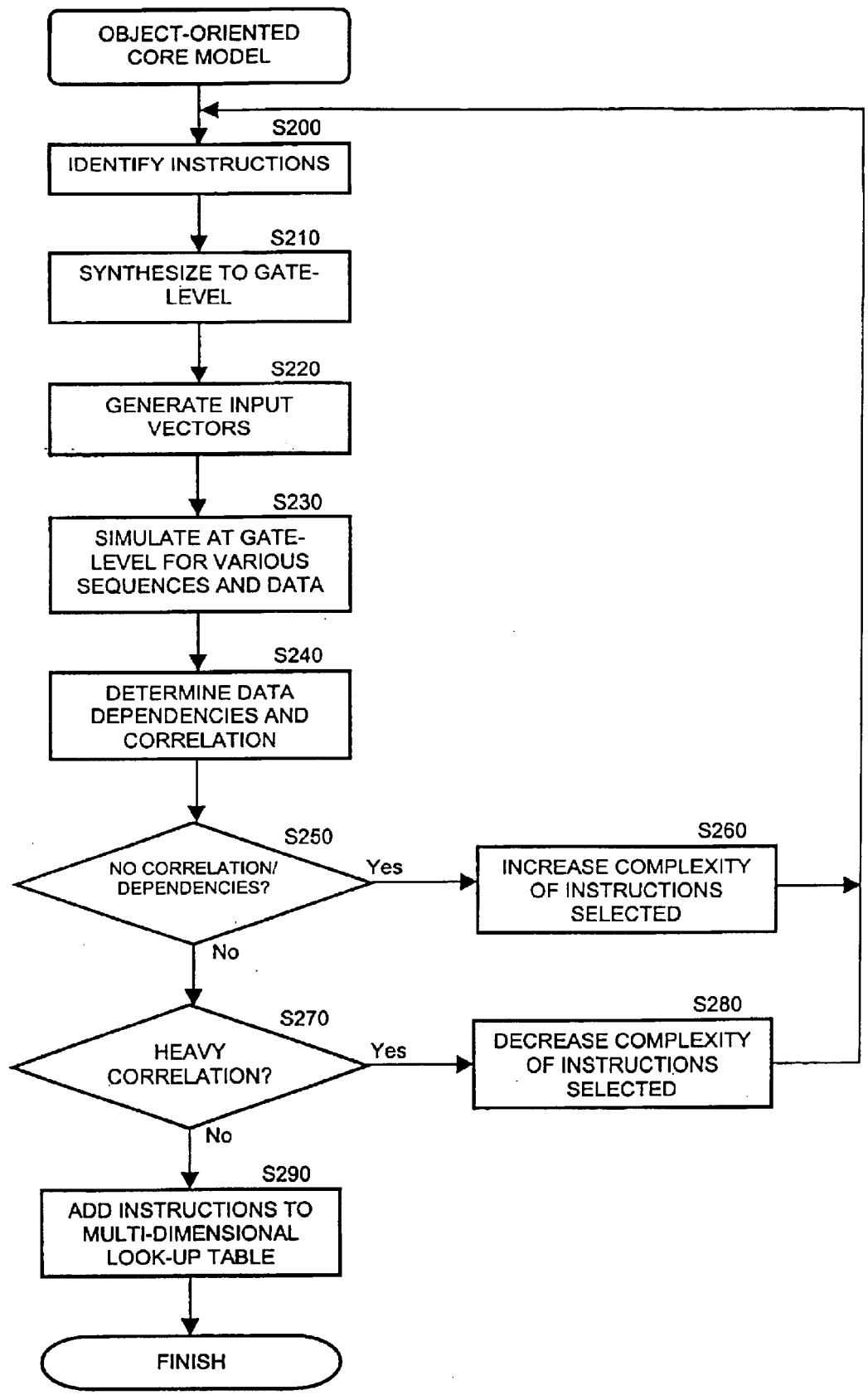
FIG. 7 illustrates the process flow for refining the correlation between gate-level simulations and simulated instructions.

The correlation of the captured gate-level data simulation data in Step S110 to the instructions that are associated with the core model will now be described in greater detail with reference to FIG. 7. Based on the set of instructions selected in Step S200, a synthesis to the gate level is performed in Step S210. As a result of the synthesis, in Step S220, input vectors are defined. In Step S230, via a sequence of input vectors that represent various instructions, the designer tests whether a correlation between instruction in terms of energy consumption exists. The identical concept holds for input vectors that are defined for one and the same instruction but for varied data they work on. Thus, the sensitivity for data dependency is measured. Please note that the representation of one instruction might require many test vectors since an instruction can be quite complex.

In Step S240, after the initial set of input vectors is simulated in terms of energy dissipation at gate-level the set of initially defined instructions is refined, the method then requests the designer to determine the data dependencies and correlation between instructions of the initially defined instruction set.

In Step S250, if the analysis of the instruction set indicates that no data dependencies and no correlations between instructions exist, then refinement of the instruction set is in order. In Step S260, the instruction set is refined such that the comprised instructions are chosen more complex (i.e., implying a smaller overall number of instructions) since this is simplifies the implementation of the core energy library (i.e., "look-up table") and reduces the complexity of simulation.

If, in Step S260, if heavy correlation between the instructions are revealed and/or large data dependencies are revealed, then refinement of the instruction set is in order. In Step S270, the instruction set is refined to become less complex (i.e., implying a larger overall number of instructions). This refinement, in turn, facilitates more precise energy estimations.

If the designer is satisfied with the amount of correlation between instructions and the data dependencies of the refined instruction set, then, in Step S280, the instruction set is stored in a look-up table. The refinement process is iterated until a good compromise between these two characteristics is reached.

Referring back to FIG. 6, the execution of an algorithmic-level executable specification in Step S120 to obtain energy estimations for each instruction that is simulated by the core model will now be described in greater detail. The user of the core models will select a set of objects representing the cores of the system under design. These core models will be integrated together using one of the methods described earlier, i.e., message-passing or method-passing. Then, this system model will be simulated. At the end of the simulation, each core in the model will output power and performance data, e.g., toggle count. Multiple simulation runs can be carried out to obtain power and performance data for different core parameter values and configurations.

The data outputted by the cores will be subsequently used in an analysis tool. At the minimum, the analysis tool will apply proper technology specific metrics, e.g., capacitance, clock frequency, etc., to the data obtained from simulation in order to produce power and performance estimates. For example, the analysis tool will multiply the square of the supply voltage and the average cell capacitance with the toggle switch data to obtain power estimates. The analysis tool may examine other simulation data, such as I/O frequency to and from different cores, to also perform estimates of power consumed by on-chip busses.

Figure 8:
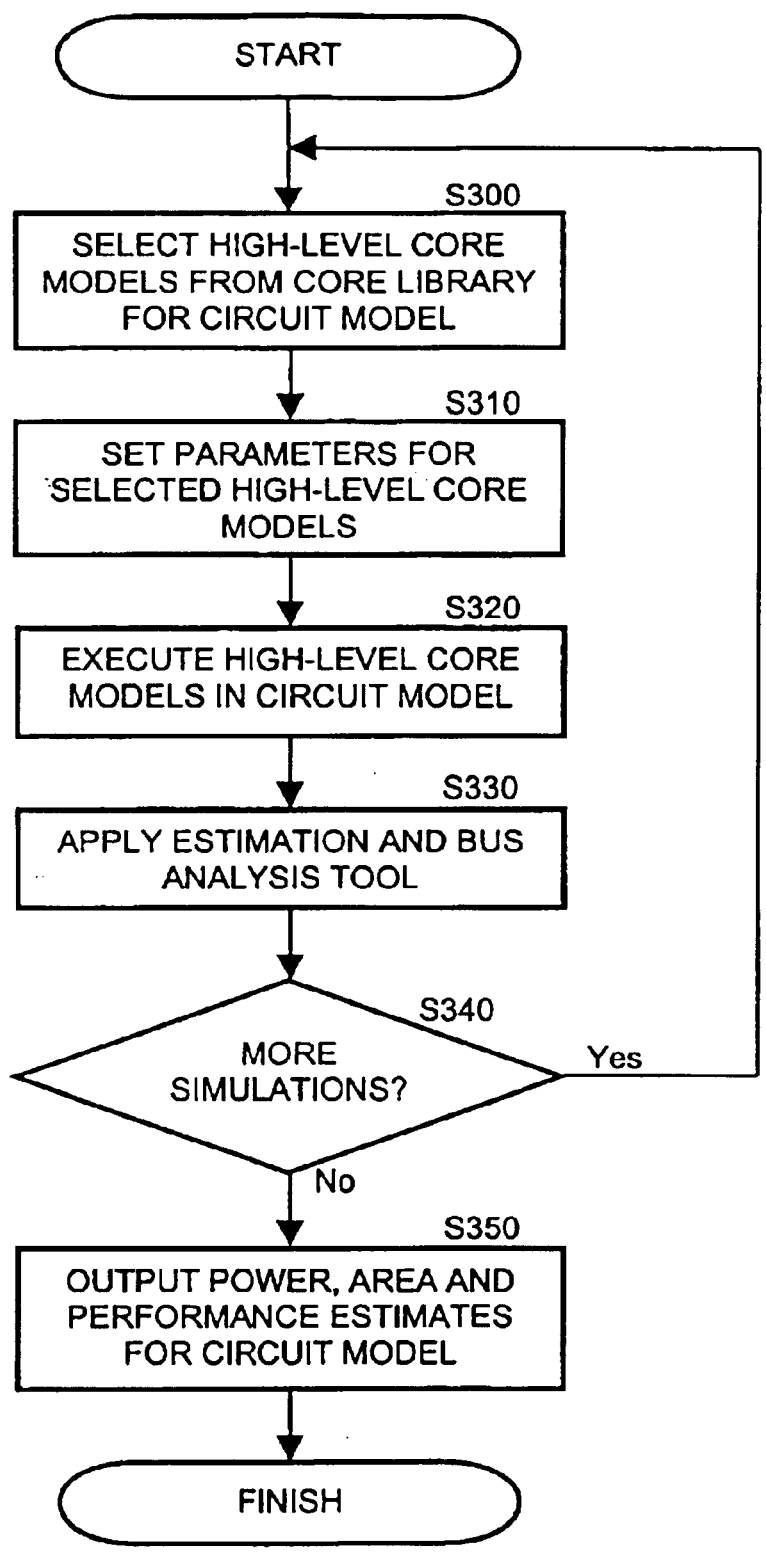
FIG. 8 illustrates a second embodiment for energy and power analysis for a circuit model using core models.

A second embodiment of the present invention is embodied in a method of modeling energy and power requirements for a system-on-a-chip. The method of the second embodiment will now be described in summary fashion with reference to FIG. 8.

In Steps S300 and S310, a circuit model of the system-on-a-chip is deployed by selecting at least one parameterized instruction-based core model and instantiating the parameterized instruction-based core model into the circuit model. In Step S320, the instructions of the core models within the circuit model are executed. In Step S330, the estimated energy requirements of the circuit model are analyzed. If more instructions require execution, then the process repeats itself. In Step S350, the estimated energy requirements for the circuit model are output.

The deployment of a circuit model of the system-on-a-chip by selecting at least one parameterized instruction-based core model and instantiating the parameterized instruction-based core model into the circuit model, as shown in Steps S300 and S310, will now be described in greater detail. The user of the core models will select a set of objects representing the cores of the system under design. These core models will be integrated together using one of the methods described earlier, i.e., message-passing or method-passing. As described earlier, the core models that are used in the circuit model are parameterizable, such that multiple tables of toggle-counts or equations for different parameter values can be invoked via parameter passing during the instantiation of the core model into the circuit model.

The next step 1n the method, as shown by S320, is executing the circuit model, wherein the instructions of the core model are executed. These core models in the circuit model will be integrated together using one of the methods described in the system-level modeling section. Then, this circuit model will be executed for the various instructions incorporated in the core models. At the end of the simulation, each core model in the circuit model will output power data (through toggle count) and performance data. Multiple simulation runs can be carried out to obtain power and performance data for different core parameter values and configurations.

The next step performed in the method, as shown by Step S330, is analyzing the estimated energy requirements of the circuit model. The data outputted by the cores will be subsequently used in an analysis tool. At the minimum, the analysis tool will apply proper technology specific metrics, e.g., capacitance, clock frequency, etc., to the data obtained from simulation in order to produce power and performance estimates. For example, the analysis tool will multiply the square of the supply voltage and the average cell capacitance with the toggle switch data to obtain power estimates. The analysis tool may examine other simulation data, such as I/O frequency to and from different cores, to also perform estimates of power consumed by on-chip busses.

The final step S350 is outputting the estimated energy requirements for the circuit model. At the end of the simulation, each core model in the circuit model will output power and performance data. Multiple simulation runs can be carried out to obtain power and performance data for different core parameter values and configurations.

Figure 9A:
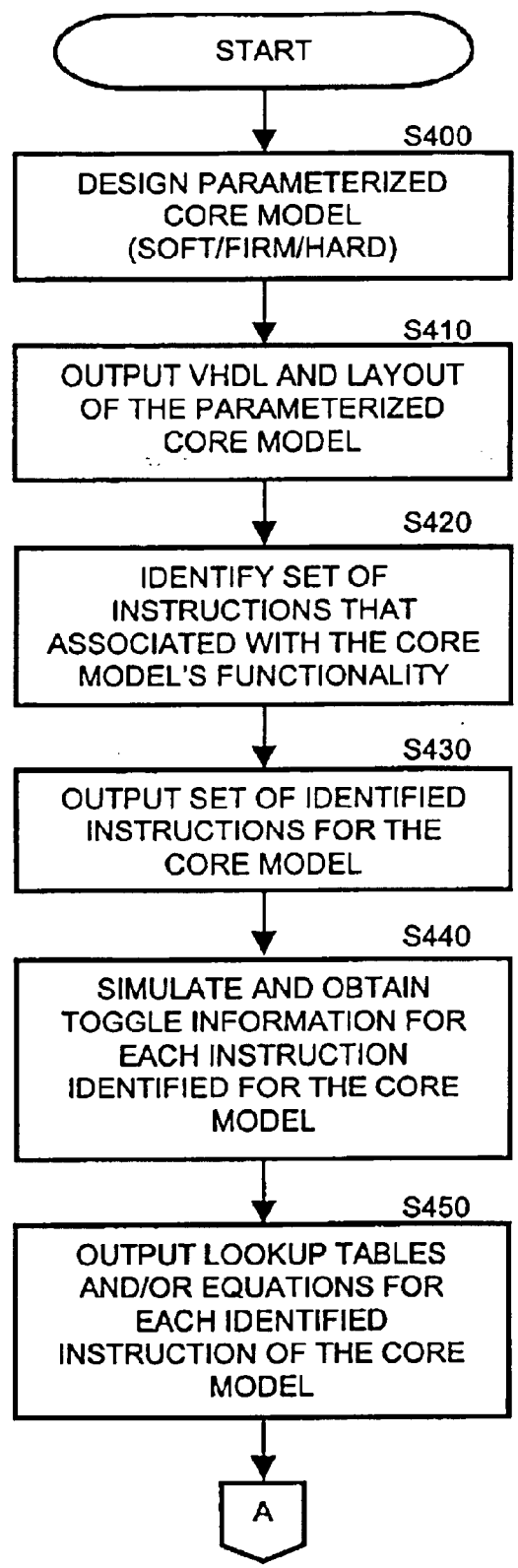
FIGS. 9A–9B illustrate the process flow for developing a core model according to the present invention.
Figure 9B:
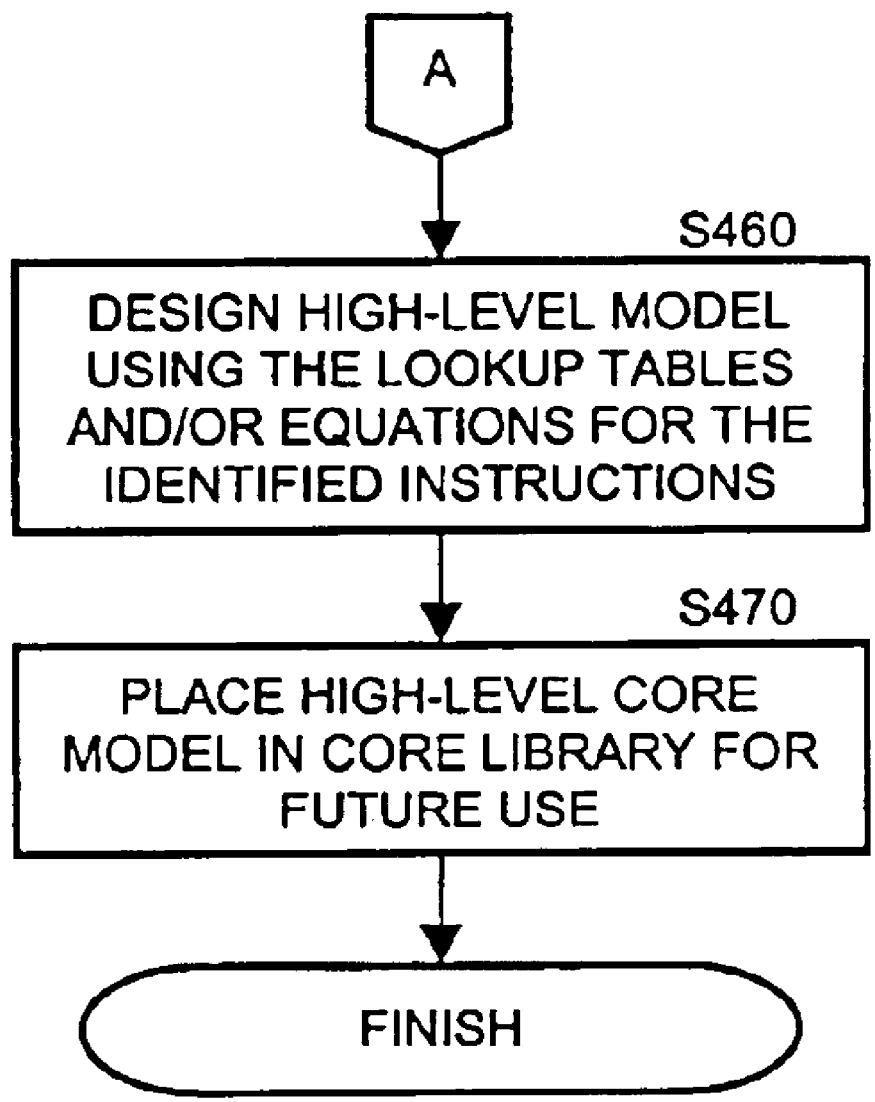

A third embodiment of the present invention is embodied in a method for creating a library of instruction-based core energy models. The third embodiment will now be described in summary fashion with reference to FIGS. 9A–9B. The first step of the method, as shown by Step S400 and S410, is deploying a circuit model using a hardware description language. Next, the method defines a plurality of high-level instructions correlating to functions supported by the circuit model as shown by Steps S420 and S430. The method next acquires gate-level energy simulation data for each component comprising the circuit model, and then collects a plurality of toggle count sets corresponding to each of the plurality of instructions, as shown in Steps S440–S460. The method assigns each of the plurality of toggle count sets to one of the plurality of instructions. This step creates an instruction-based core energy model. Finally, the method implements the instruction-based core energy model within a library that is realized as a look-up table, as shown in Step S470.

Deploying a circuit model using a hardware description language will now be described in greater detail. As described above, a core developer will start by designing and capturing the functionality of the core model using a hardware description language. The artisan will choose between making a soft, firm or hard parameterized core model, as illustrated in Step S400. Various hardware description languages and computer tools are known in the art and available for the skilled artisan to create a VHDL embodiment of the desired core model, along with a layout of the core model.

Defining a plurality of high-level instructions correlating to functions supported by the circuit model will now be described in greater detail. The core developer will identify a set of instructions describing the functionality of this core model. The functions that will be identified for a particular model will be high-level instructions, i.e., "transmit-msg" or % reset-xmtr" as opposed to low-level instructions such as "move" or "add." Please refer to FIG. 7 for additional details regarding the development of the instruction set for a core model.

Acquiring gate-level energy simulation data for each component comprising the circuit model and collecting a plurality of toggle count sets corresponding to each of the plurality of instructions will now be described in greater detail. Using an HDL description of a core and a set of identified instructions, the core developer will create specialized testbench programs for each instruction in order to measure design metrics such as performance or power. Then, the HDL description of the modeled circuit is synthesized, and the circuit model is simulated on the testbench program, thereby accumulating toggle switch information. This process is repeated for all other instructions and a table of toggle switches for each instruction is created. Please refer to FIG. 7 for additional details regarding the development of the instruction set for a core model.

The method assigns each of the plurality of toggle count sets to one of the plurality of instructions. This step creates an instruction-based core energy model. The refinement process between instructions and gate-level simulation data, as described above with reference to FIG. 7, is implemented.

Finally, the method implements the instruction-based core energy model within a class library. The class library can be realized as a look-up table. The core model is loaded into the core model library using standard techniques for the creation of a class library.

A fourth embodiment of the present invention is embodied in a computer program product for use in a computer system in which core models are accessed by an application program. The computer program product will be now described in summary fashion with reference to FIGS. 10A–10B. The computer program product includes a computer usable medium bearing computer executable code. The computer executable code is comprised of several code portions. The first executable code portion determines if the core model should simulate an idle state or exe cute an instruction, based upon whether the core model is called by another core model or it is called by a control object. The second executable code portion determines if resources required by the core model are free, and claiming the free resources if necessary. The third executable code portion adds an idle energy value to an energy accumulator. The fourth executable code portion determines if a clock counter is decremented, thereby collecting data about the elapsed time and calculating the consumed power from the energy data. The fifth executable code portion simulates the execution of a predetermined instruction. Finally, the computer executable code contains a sixth executable code portion for adding energy value to the energy is accumulator.

The first executable code portion that determines if the core model should simulate an idle state or execute an instruction, based upon whether the core model is called by another core model or it is called by a control object will now be described in greater detail. If the core is Busy, i.e., another core claimed this core for a particular time in order to accomplish its own task, this core cannot be claimed by any other core model. The core model can either be called by another core model (i.e., core call) or it is called by a control object that takes care of the interplay of all cores, which together model the whole SOC behavior. Referring to FIG. 1A, these aforementioned steps of the method implemented by the first executable code portion are illustrated by Steps S500–S520.

Each core model is called during every simulated clock cycle (i.e., polling) by a control object. That ensures that during every clock cycle the branch identified as not being called by another core model will be visited and thus accruing action of a core can be simulated. This guarantees that the "busy" flag is reset once the cycles counter decrements to zero.

Figure 10A:
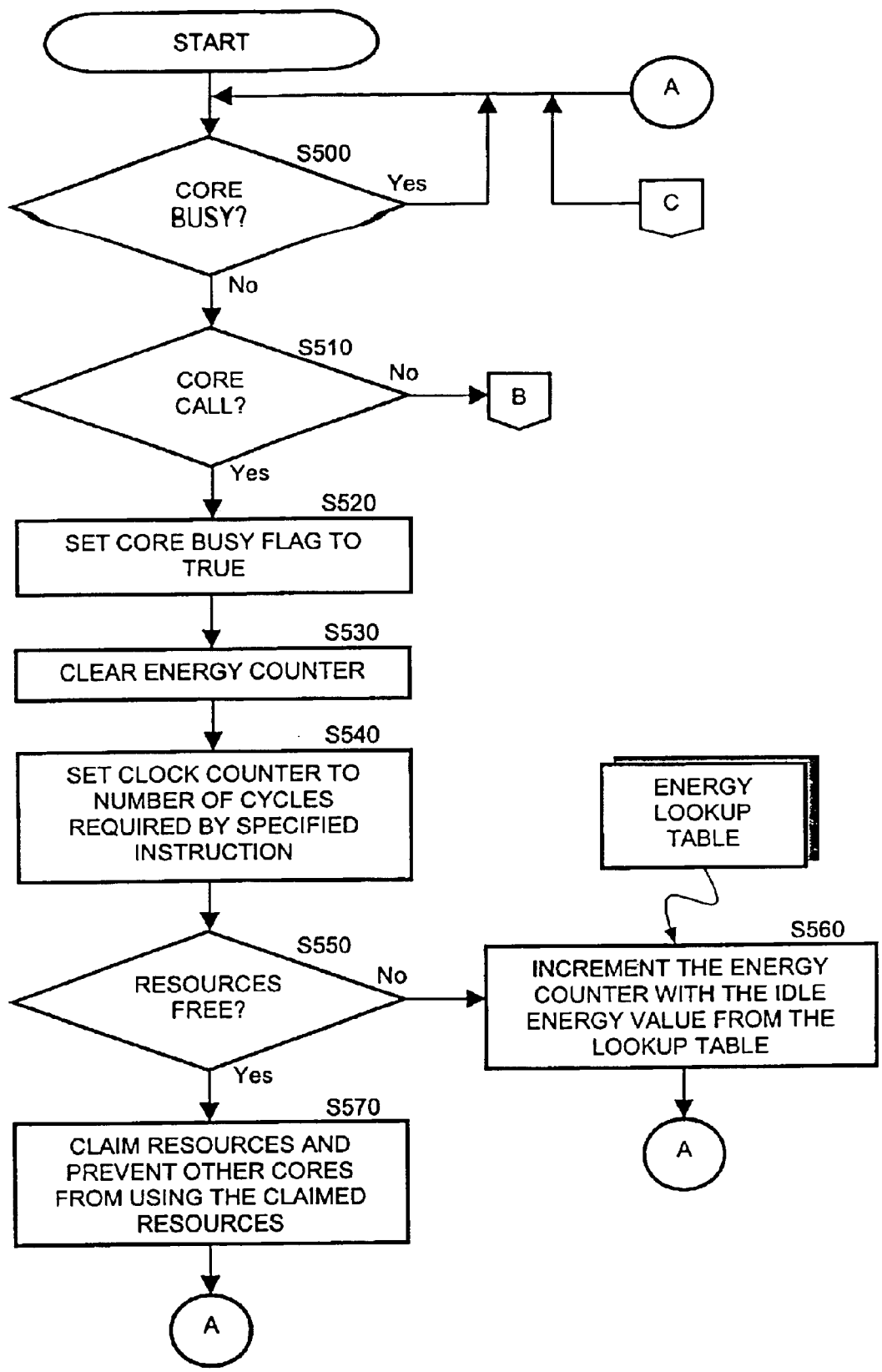
FIGS. 10A–10B illustrate the process flow within a core model incorporating energy and power analysis for a core mode embodying a specified instruction set.

The other branch may or may not be taken during every dock cycle. This entirely depends on whether or not another core model needs the service (i.e., is calling) this particular one. Please also note that through this concept during one simulated clock cycle both branches can be taken: one time through a call from the control object and one time through a call from another core model. Referring to FIG. 10A, these aforementioned steps of the method implemented by the first executable code portion are illustrated by Steps S500–S520.

The first executable code portion also clears an energy counter and sets a simulated clock cycle counter to the number of cycles specified by the instruction currently being executed by the control object. These steps are performed if the core model is called by another core model. Referring to FIG. 10A, these aforementioned steps of the method implemented by the first executable code portion are illustrated by Steps S530–S540.

The second executable code portion that determines if resources required by the core model are free, and claiming the free resources if necessary will now be described in greater detail. If first executable code portion determines that the core model is being called by another core model, it determines whether the resources that will be used by this core model are available or not. If the resources are available, then those resources are claimed for the time they are needed (and at this time they are unavailable to other core models). Referring to FIG. 10A, these aforementioned steps of the method implemented by the second executable code portion are illustrated by Steps S550 and S570.

The third executable code portion that adds an idle energy value to an energy accumulator will now be described in greater detail. The according core model is put into the busy state, the energy counter is initialized and the clock counter is set to the number of clock cycles it takes to execute the specified action, i.e., instruction, assuming that no delay (e.g. no waiting for other resources like a bus) occurs. The idle energy counter is incremented if the resources needed by the core model are not available to be claimed, as shown in Step S550. Referring to FIG. 10A, this aforementioned step of the method implemented by the third executable code portion is illustrated by Step S560.

Figure 10B:
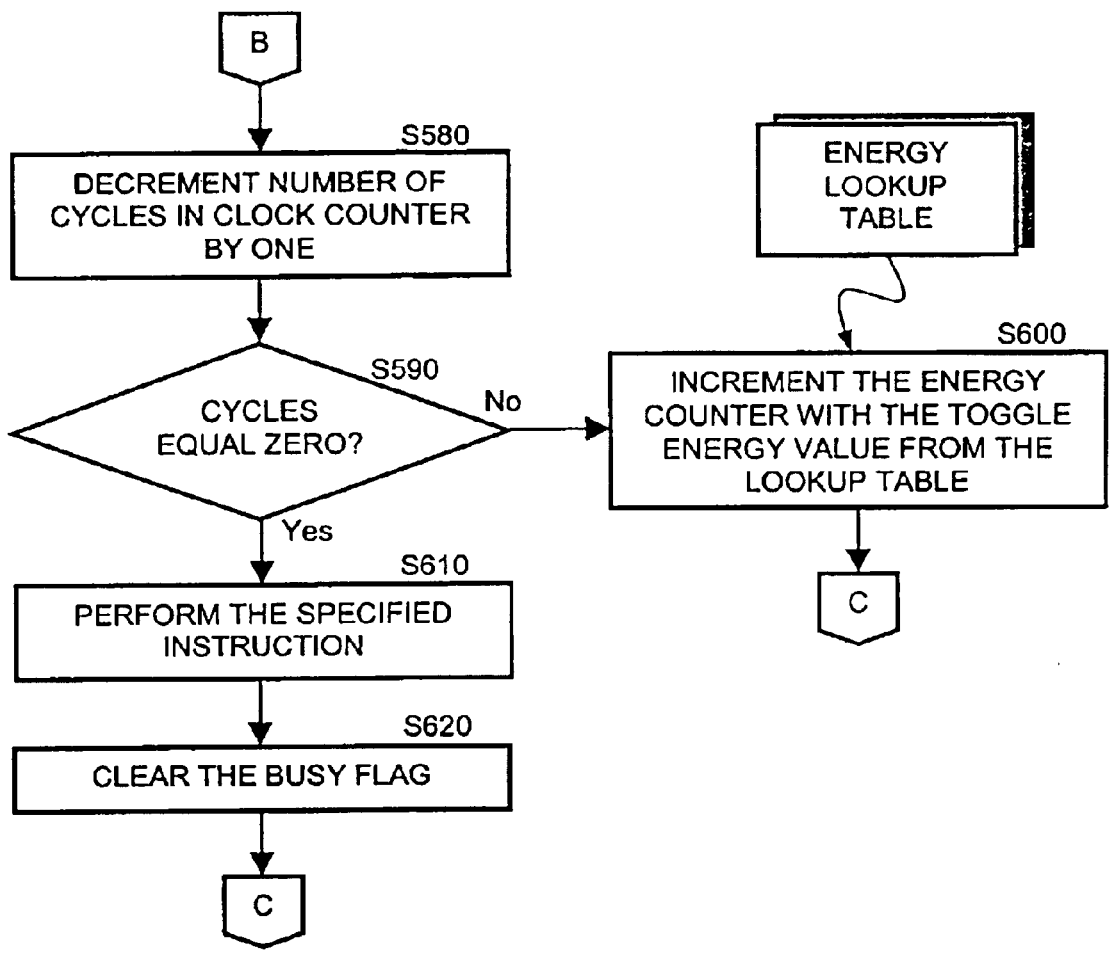

The fourth executable code portion determines if a clock counter is decremented to zero, thereby collecting data about the elapsed time and calculating the consumed power from the energy data will now be described in greater detail. If a control object is calling the core model, the clock cycles counter is decremented by one clock cycle. The fourth executable code portion checks to see if the clock cycle counter has reached zero. Referring to FIG. 10B, these aforementioned steps of the method implemented by the fourth executable code portion are illustrated by Steps S590–S600.

The fifth executable code portion that simulates the execution of a predetermined instruction will now be described in greater detail. If the clock cycle counter reaches zero, as described in the fourth executable code portion, the actual instruction is executed. Following the execution of the instruction, the busy flag is cleared. Assigning the actual instruction execution to only one clock cycle is a strong simplification and might possibly cause conflicts. This is the tradeoff for using the high abstraction level that does not allow for a cycle accurate execution. Referring to FIG. 10B, these aforementioned steps of the method implemented by the fifth executable code portion are illustrated by Steps S610–S620.

Finally, the computer executable code contains a sixth executable code portion for adding energy value to the energy accumulator. If the clock cycles counter has not reached zero, as determined by the fourth executable code portion, then the execution of this core model is delayed, thereby costing some energy for the idle state. The idle state energy is retrieved from a lookup table or is calculated from an equation. Referring to FIG. 10B, this aforementioned step of the method implemented by the sixth executable code portion are illustrated by Step S600.

A fifth embodiment of the present invention is a computer program product for use in a computer system in which core models are accessed by an application program. The embodiment will now be described in greater detail. The computer program product is a computer usable medium bearing computer programming statements for enabling the computer system to create at least one circuit model object for use by the application program. The computer programming statements including a class library expressing an inheritance hierarchy and including at least one core model base class for constructing instances of the at least one circuit model object. The core model base class is representative of a circuit element, wherein the core model base class has been constructed according to the present invention. In addition, the core model base class includes, as a respective subclass thereof, an autonomous core model class defining at least one core model member function for directly interacting with the application program. Also, the one core model member function simulates an instruction associated to the circuit element, wherein the circuit element provides predetermined data correlated to the simulated instruction.

The embodiment described herein can be assembled using object-oriented techniques available to one of skill in the art. The member functions of the core model base class correlate to the instructions that are simulated in the core model, i.e., "transmit-reg" or "clear-reg", etc., as described herein by the present invention. As is typical of object-oriented programming, the member functions can be called by other core model objects or by a control object. The member functions are tied to the appropriate gate-level simulation data, as described herein by the present invention.

The sixth embodiment of the present invention is a computer system having an application program that models the energy and power requirements of a system-on-a-chip circuit design.

Figure 11:
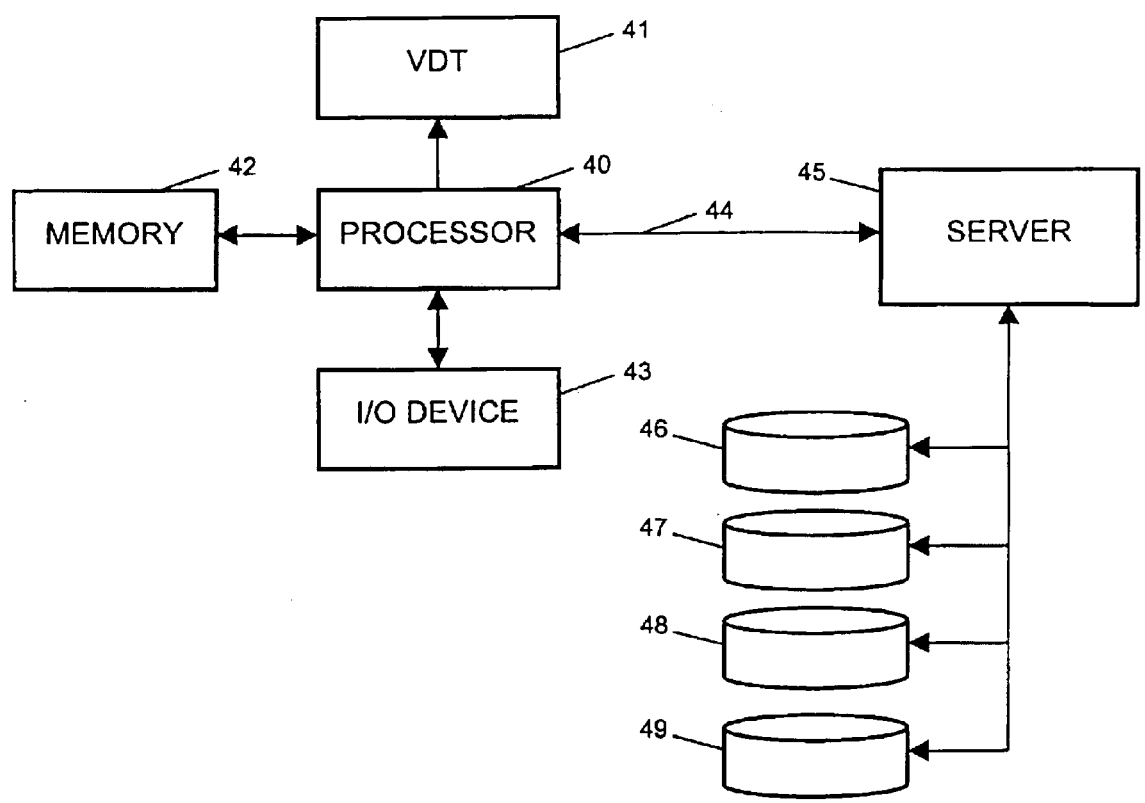
FIG. 11 illustrates an embodiment of a computer system.

Referring to FIG. 11, an embodiment of a computer system is depicted, including a processor 40, I/O devices 43 and a video display terminal 41. The computer system further includes a memory 42 including software instructions adapted to enable the computer system to perform the steps of the invention as described.

The computer network embodiment incorporates a server 45, connected to the processor 40 by a data link 44. The data link 44 is a conventional data link (e.g., Ethernet, twisted pair, FTP, HTUP, etc.) as is well-known in the art. The server 45 provides access to the core model libraries 46–49 connected to the server. As described above, the core model libraries 46–49 may be embodied on any number of different mediums (e.g., floppy disk, hard disk, optical disk, cartridge, tape, CD-ROM, writable CD, etc.) as are known in the art. The software instructions on the memory 42 allow the processor 40 to access the server 45 via the data link 44, thereby providing access to the core model libraries 46–49.

The computer system contains an energy and power modeling method for an application program to access and execute a parameterized core model of a circuit element. The computer system provides to the application program a circuit object representing a modeled circuit, wherein the circuit object has instantiated at least one parameterized core model having at least one member function for simulating functions assigned to circuit element. The core model has been developed according to the present invention. The member function outputs an energy and power estimation correlated with each simulated function. The computer system allows the application program to send a message to the circuit object to invoke the at least one member function, thereby executing a simulated function of the circuit element. The computer system also allows the circuit object to send a message to the application program embodying the energy and power estimation with respect to the invoked member function.

The seventh embodiment of the present invention is a computer system having an application program that models the energy and power requirements of a system-on-a-chip circuit design. The computer system contains an energy and power modeling method for an application program to access and execute a parameterized core model of a circuit element, wherein the core model has been developed according to the present invention.

The applications program will execute the circuit model, wherein the, circuit model comprises a circuit object that has instantiated a parameterized core model incorporating core functions, wherein the core functions have been developed according to the present invention. The parameterized core models of each circuit element are constructed as described above. The member function simulates functions assigned to circuit element. The member function outputs energy and power estimations correlated with each simulated function of the circuit element. The objects and member functions are constructed using standard object-oriented techniques as is known in the art.

As is known in object-oriented programming, the application programs sends a message to the instantiated core models to invoke the at least one member function, thereby executing a simulated function of the circuit element. In a similar fashion, the instantiated core model can also send messages to the application program embodying the energy and power estimation with respect to the invoked member function. As described above, this messaging can be either in the form of message passing or in method calling.

Figure 12:
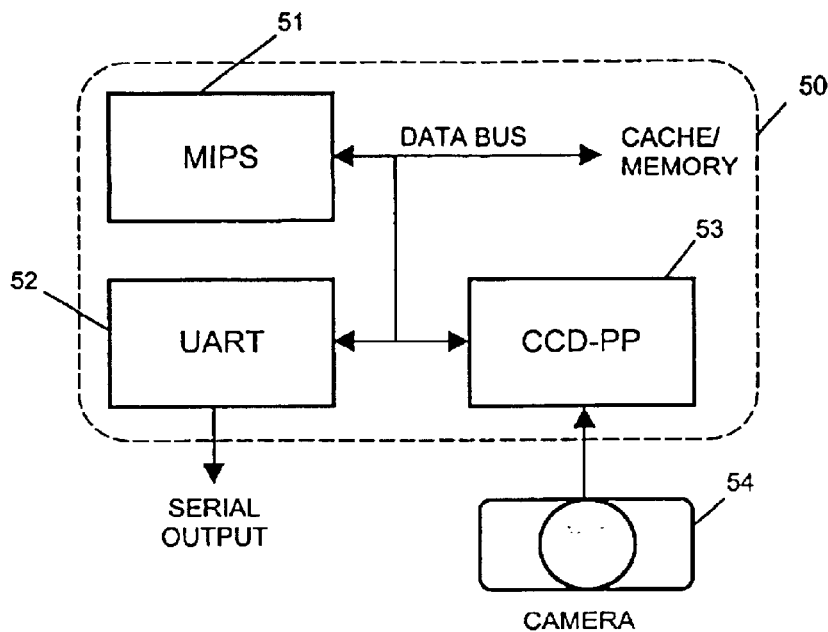
FIG. 12 depicts a digital camera example illustrating the use of core models for the estimation of power and energy consumed by various simulated functions.
Figure 13:
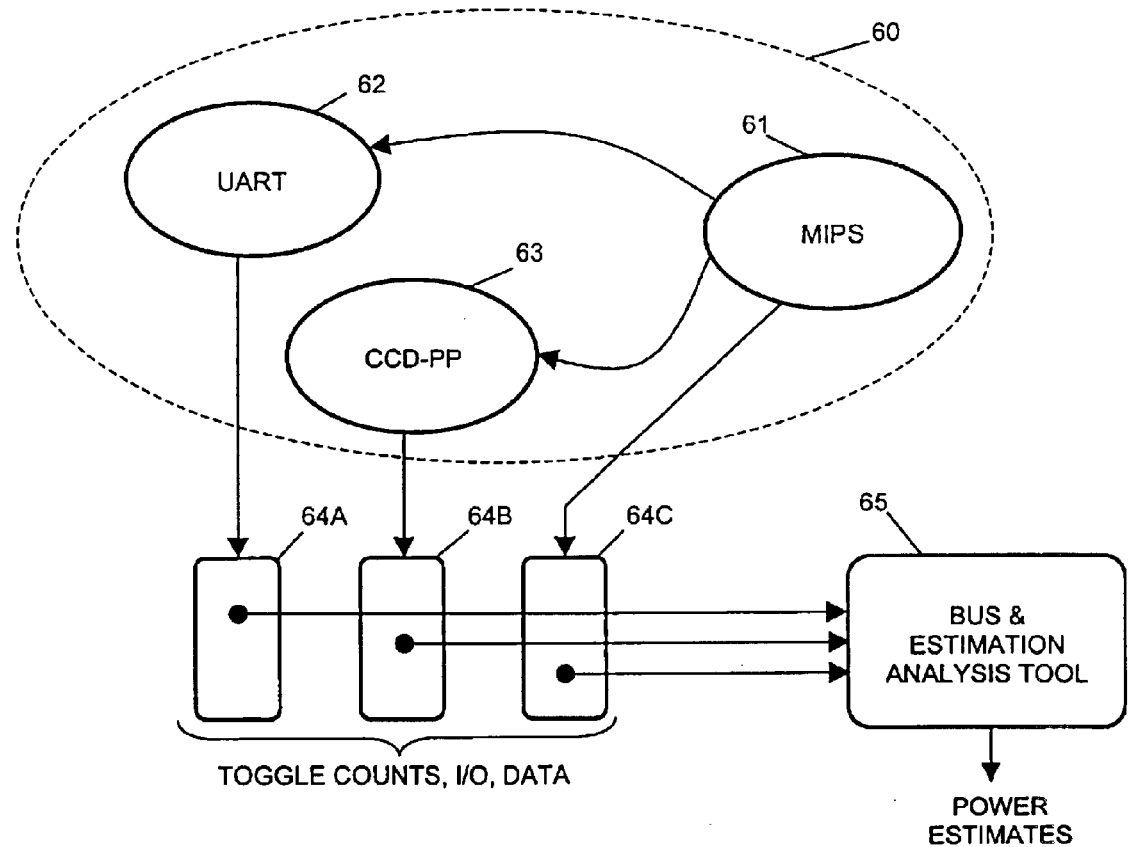
FIG. 13 depicts the process flow for the energy and power analysis for a digital camera that is simulated with core models.

To illustrate the concepts of the present invention, a digital camera 54 was modeled using method calling objects. FIG. 12 illustrates the layout of the digital camera 54. FIG. 13 shows the interrelationships between the three main elements, named CCDPP 53, MIPS 51 and UART 52 that capture, process and output digitized pictures.

Referring to FIG. 12, the heart of the digital camera 54 is a simplified MIPS processor 51 and on-chip cache bounded together via a high-speed bus and surrounded by a number of peripheral devices, i.e., cores, communicating over a peripheral bus designed for layout on a single chip. The application running on the MIPS issues a 'capture' command to the CCDPP (charged coupled device—preprocessor) 53 which in turn uses a CCD to capture and processes a single frame and stores it into internal memory. The application running on the MIPS 51 then clocks out the image, one pixel at a time, and stores it into memory to be encoded, displayed and serially transmitted via a UART 52. The UART core 62 can be synthesized to have an internal buffer size of 2k, 4k, 8k, or 16 kbytes. As discussed previously, the UART core 62 can be parameterized to accommodate the various buffer sizes. The CCDPP core 63 can be synthesized for use with 8×8, 16×16 and 32×32 CCDs. Gate-level accurate power and performance results to serve as a reference for determining the accuracy of estimates have been obtained for the high-level model.

The high-level model is composed of three C++ objects representing the MIPS core 61, CCDPP core 63 and UART core 62. FIG. 13 depicts the objects, and their relationship to each other. Each one of these objects provides member functions, i.e., methods that functionally describe what the core model represents. The CCDPP core 63 and UART core 62 can be instantiated with different buffer or image sizes. This allows for estimates for different core parameter configurations. For the digital camera, three instructions were defined that abstractly model the CCDPP core 63, namely, "reset," "capture" and "read pixel." The corresponding methods, when invoked, add to a member variable (initialized to zero on start of the simulation) some number of toggle switches obtained from gate-level simulation. Similarly, the UART core 62 is broken into four instructions, "reset," "enable," "disable" and "write buffer." These toggle switch counters 64A–64C are outputted by each object at the end of the simulation, along with I/O and timing information from the MIPS core 61 to be used in a subsequent power/performance and bus analysis tool as described next.

The analysis tool 65 reads the toggle switch data from simulation and computes power using technology specific metrics such as wire/gate capacitance, and supply voltage. In addition, I/O (frequency of method calls) is used to explore peripheral bus configurations such as width and encoding for low power and acceptable performance.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A method for energy and power estimation of a core-model based embedded system, wherein the method comprises:

capturing gate-level energy simulation data, wherein the captured gate-level data simulation data correlates to an initially defined instruction set;

determining if no data dependencies or no correlation between instructions of the initially defined instruction set are present, and if so, increasing the complexity of the initially defined instruction to create a refined instruction set;

determining if data dependencies or correlation between instructions of the initially defined instruction set are present, and if so, decreasing the complexity of the initially defined instruction set to create a refined instruction set;

deploying the refined instruction set in an algorithmic-level executable specification; and executing the algorithmic-level executable specification to obtain energy estimations for each instruction of the refined instruction set.

2. A method of modeling energy and power requirements for a system-on-a-chip, wherein the modeling method comprises:

deploying a circuit model of the system-on-a-chip by selecting at least one parameterized instruction-based core model and instantiating the at least one parameterized instruction-based core model, wherein the instruction-based core model comprises a refined instruction set derived from captured gate-level energy simulation data, wherein the captured gate-level data simulation data is correlated to an initially defined instruction set, and the complexity of the initially defined instruction set has been increased or decreased on the basis of the presence of data dependencies or correlation between instructions of the initially defined instruction set to form the refined instruction set;

executing the circuit model by invoking instructions from the refined instruction set;

analyzing the estimated energy requirements of the circuit model; and outputting the estimated energy requirements for the circuit model.

3. The method of modeling energy and power requirements for a system-on-a-chip as claimed in claim 2, wherein the least one parameterized instruction-based core model.

4. A method for creating a library of instruction-based core energy models, wherein the method comprises:

deploying a circuit model using a hardware description language;

defining a plurality of high-level instructions correlated to functions supported by the circuit model;

acquiring gate-level energy simulation data for each component comprising the circuit model;

collecting a plurality of toggle count sets corresponding to each of the plurality of high-level instructions;

assigning each of the plurality of toggle count sets to one of the plurality of high-level instructions, thereby creating an instruction-based core energy model;

determining if no data dependencies or no correlation between instructions of the plurality of high-level instructions are present, and if so, increasing the complexity of the plurality of high-level instructions to create a refined instruction set;

determining if data dependencies or correlation between instructions of the plurality of high-level instructions are present, and if so, decreasing the complexity of the plurality of high-level instructions to create a refined instruction set; and implementing the instruction-based core energy model incorporating the refined instruction set within the library that is realized as a look-up table.

5. The method for creating a library of instruction-based core energy models as claimed in claim 4, wherein the assigning each of the plurality of toggle count sets to one of the plurality of instructions further comprises increasing the number of high-level instructions to reduce data dependency.

6. A computer program product for use in a computer system in which core models are accessed by an application program, the computer program product including a computer usable medium bearing computer executable code, the computer executable code comprising:

a first executable code portion for determining if the core model should simulate an idle state or execute an instruction, based upon whether the core model is called by another core model or it is called by a control object;

a second executable code portion for determining if resources required by the core model are free, and claiming the free resources;

a third executable code portion for adding an idle energy value to an energy accumulation count;

a fourth executable code portion for determining if a clock counter is decremented, thereby collecting data about the elapsed time and calculating the consumed power from the energy data;

a fifth executable code portion for simulating execution of a predetermined instruction; and a sixth executable code portion for adding an energy value to the energy accumulation count.

7. A computer program product for use in a computer system in which core models are accessed by an application program, the computer program product comprising:

a computer usable medium bearing computer programming statements for enabling the computer system to create at least one circuit model object for use by the application program;

the computer programming statements including a class library expressing an inheritance hierarchy and including at least one core model base class for constructing instances of the at least one circuit model object, the core model base class representative of a circuit element;

the at least one core model base class including, as a respective subclass thereof, an autonomous core model class defining at least one core model member function for directly interacting with the application program; and the at least one core model member function simulating an instruction associated to the circuit element, the circuit element providing one-time predetermined data correlated to the simulated instruction, wherein the simulated instruction is from a refined instruction set derived from captured gate-level energy simulation data, wherein the captured gate-level data simulation data is correlated to an initially defined instruction set, and the complexity of the initially defined instruction set has been increased or decreased on the basis of the presence of data dependencies or correlation between instructions of the initially defined instruction set to form the refined instruction set.

8. In a computer system having an application program that models the energy and power requirements of a system-on-a-chip circuit design, an energy and power modeling method for an application program to access and execute a parameterized core model of a circuit element, the computer system comprising a computer readable medium bearing computer executable code that implements the power and energy modeling method, wherein the method comprises:

providing to the application program a circuit object representing a modeled circuit, the circuit object having instantiated at least one parameterized core model having at least one member function for simulating functions assigned to circuit element, wherein the at least one member function outputs an energy and power estimation correlated with each simulated function and the parameterized core model comprises a refined instruction set associated with the at least one member function and derived from captured gate-level energy simulation data, wherein the captured gate-level data simulation data is correlated to an initially defined instruction set, and the complexity of the initially defined instruction set has been increased or decreased on the basis of the presence of data dependencies or correlation between instructions of the initially defined instruction set to form the refined instruction set;

sending a message from the application program to the circuit object to invoke the at least one member function, thereby executing a simulated function of the circuit element; and sending a message from the circuit object to the application program embodying the energy and power estimation with respect to the invoked member function.

* * * * *